United States Patent
Kim et al.

(10) Patent No.: US 7,492,121 B2
(45) Date of Patent: Feb. 17, 2009

(54) SMART BATTERY AND METHOD FOR RECOGNIZING BATTERY TYPE USING THE SAME

(75) Inventors: Jong Sam Kim, Kyunggi-do (KR); Tetsuya Okada, Kyunggi-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 201 days.

(21) Appl. No.: 11/216,458

(22) Filed: Aug. 30, 2005

(65) Prior Publication Data
US 2006/0076924 A1   Apr. 13, 2006

(30) Foreign Application Priority Data
Aug. 30, 2004   (KR) .................. 10-2004-0068416

(51) Int. Cl.
*H02J 7/14*   (2006.01)
(52) U.S. Cl. .................. 320/106; 320/112; 340/636
(58) Field of Classification Search .................. 320/106, 320/107, 112, 114, DIG. 19, DIG. 21; 307/113, 307/116; 340/635, 636
See application file for complete search history.

(56) References Cited

U.S. PATENT DOCUMENTS

| | | | |
|---|---|---|---|
| 5,300,874 A * | 4/1994 | Shimamoto et al. | 320/106 |
| 5,510,690 A * | 4/1996 | Tanaka et al. | 320/106 |
| 5,592,069 A * | 1/1997 | Dias et al. | 320/106 |
| 5,606,242 A * | 2/1997 | Hull et al. | 320/106 |
| 5,641,587 A * | 6/1997 | Mitchell et al. | 429/90 |
| 5,710,501 A * | 1/1998 | van Phuoc et al. | 307/150 |
| 5,764,028 A * | 6/1998 | Freiman et al. | 320/106 |
| 5,767,659 A * | 6/1998 | Farley | 320/106 |
| 5,796,239 A * | 8/1998 | van Phuoc et al. | 320/107 |
| 5,850,134 A * | 12/1998 | Oh et al. | 320/106 |
| 5,903,764 A * | 5/1999 | Shyr et al. | 713/300 |
| 6,018,228 A * | 1/2000 | Dias et al. | 320/106 |
| 6,181,103 B1 * | 1/2001 | Chen | 320/106 |
| 6,285,158 B1 * | 9/2001 | Higuchi | 320/106 |
| 6,291,966 B1 * | 9/2001 | Wendelrup et al. | 320/106 |
| 6,768,286 B2 * | 7/2004 | Trembley | 320/117 |
| 6,794,849 B2 * | 9/2004 | Mori et al. | 320/107 |
| 6,809,649 B1 * | 10/2004 | Wendelrup et al. | 340/636.1 |
| 7,227,333 B2 * | 6/2007 | Yamada et al. | 320/106 |

\* cited by examiner

*Primary Examiner*—Akm E Ullah
*Assistant Examiner*—M'Baye Diao
(74) *Attorney, Agent, or Firm*—Chrisitie, Parker & Hale, LLP

(57) ABSTRACT

A smart battery pack and a method for recognizing the battery type using the same. The smart battery pack includes at least one battery cell coupled to an external set via positive and negative electrode terminals. A timer circuit is coupled to the external set via a data terminal and is adapted to apply a predetermined timer circuit signal for a period of time when a predetermined signal is applied from the external set. A first switch is controlled by the timer circuit and applies electric power from the battery cell, and a register outputs a predetermined register signal causing a smart battery controller to output battery type information to the external set. The smart battery pack has only one data line between the smart battery pack and the external set (and one data terminal on each) facilitating communication between the devices while maintaining a reduced manufacturing cost.

20 Claims, 5 Drawing Sheets

SMART BATTERY AND METHOD FOR RECOGNIZING BATTERY TYPE USING THE SAME

CROSS REFERENCE TO RELATED APPLICATION

This application claims priority to and the benefit of Korean Patent Application No. 2004-0068416 filed on Aug. 30, 2004 in the Korean Intellectual Property Office, the entire content of which is incorporated herein by reference.

BACKGROUND OF THE INVENTION

1. Field of the Invention

The present invention relates to a smart battery pack and a method for recognizing the battery type using the same. More particularly, the present invention relates to a smart battery pack providing easy transmission of information on the type of the smart battery pack to an external set as well as allowing reduced manufacturing cost.

2. Description of the Related Art

In general, a smart (self-monitoring analysis and reporting technology) battery refers to a battery capable of performing self-diagnosis and transmitting self-diagnosis data to an external set via data lines. For example, it transmits data including battery type, remaining capacity, information on overcharging, over-discharging, over-current and temperature to an external set. In contrast, a battery capable of only supplying electric power without any smart communication function is referred to as a dummy battery. As used herein, the term "external set" shall refer to any type of portable electronic appliance including, but not limited to, a laptop computer, a personal portable terminal, a camcorder, and a portable telephone.

In conventional data communication between a smart battery pack and an external set, an on/off signal line and data lines are provided between the smart battery pack and the external set and information on the smart battery pack is transmitted in synchronization with the on/off signal. The on/off signal line may also be a dock signal line.

As data is transmitted while being synchronized with the on/off signal, data transmission without error can be realized. However, such a two-line data communication method is unsuitable for a compact electronic appliance, such as a portable electronic appliance, due to lack of space. In addition, the two terminals used for two-line data communication are expensive and increase the product price.

SUMMARY OF THE INVENTION

Exemplary embodiments of the present invention provide a smart battery pack having one data line between the smart battery pack and an external set for transmission of information on the type of the smart battery pack to the external set, as well as a data terminal formed on each of the smart battery pack and the external set for reduced manufacturing cost, and a method for recognizing the battery type using the same.

One exemplary embodiment of the present invention is a method for recognizing battery type of a smart battery pack. At least one battery cell is coupled to an external set. A timer circuit is coupled to the external set via a data terminal, the timer circuit being adapted to control application of electric power from the battery cell. In response to the application of electric power, there is a controlling of battery type information output to the external set.

According to another exemplary embodiment of the present invention, there is provided another method for recognizing the battery type including outputting a predetermined signal from an external set to a smart battery pack via a data terminal when positive and negative electrode terminals and the data terminal of the smart battery pack are connected to the external set. In response to receiving the predetermined signal from the external set, the smart battery pack operates a timer circuit and toggle a first switch on. In response to a signal indicating that the first switch has been toggled on, electric power from a battery cell is applied to a register; and a predetermined register signal is output from the register. In response to outputting the predetermined register signal, information on the type of the smart battery pack is output from the smart battery pack to the external set via the data terminal. In response to outputting information on the type of the smart battery pack, information on the type of the smart battery is read and a decision is made regarding whether the type of the smart battery is suitable for the external set or not The method may further include in response to deciding that the type of the smart battery pack is suitable for the external set, authentication information is output causing the smart battery pack to toggle on the second switch, which is coupled between the external set and the smart battery pack, so that electric power is supplied from the smart battery pack to the external set. Alternatively, in response to deciding that the type of the smart battery pack is not suitable for the external set, the method may further provide for non-authentication information to be output causing the smart battery pack to toggle off the second switch, which is connected between the external set and the smart battery pack, so that electric power is prevented from being supplied from the smart battery pack to the external set.

Another exemplary embodiment of the present invention is a method for supplying electric power from a smart battery pack to an external set if the battery type is suitable. The method includes receiving a predetermined signal from an external set via a data terminal when a positive electrode terminal, a negative electrode terminal and the data terminal of a smart battery pack are connected to the external set. In response to receiving the predetermined signal from the external set, the smart battery pack operates a timer circuit and toggles a first switch on. In response to a signal indicating that the first switch has been toggled on, electric power is applied from a battery cell to a register and a predetermined register signal is output from the register. In response to outputting the predetermined register signal, information on the type of smart battery pack is output via the data terminal. In response to an external set deciding that the type of the smart battery pack is suitable, authentication information is received from an external set. In response to receiving authentication information from an external set, a second switch is toggled on so that electric power is supplied from the smart battery pack to the external set. In response to an external set deciding that the type of the smart battery pack is not suitable, non-authentication information is received from an external set. In response to receiving non-authentication information from an external set, a second switch is toggled off so that electric power is not supplied from the smart battery pack to the external set.

Another exemplary embodiment of the present invention is a smart battery pack including at least one battery cell coupled to an external set via a positive electrode terminal and a negative electrode terminal. The smart battery pack also includes a timer circuit coupled to the external set via a data terminal and adapted to apply a predetermined timer circuit signal for a period of time when a predetermined signal is applied from the external set. A first switch is controlled by the timer circuit and is adapted to apply electric power from the at least one battery cell. A register is adapted to output a predetermined register signal in response to receiving power from the battery cell. A smart battery controller is adapted to output battery type information upon receiving the predetermined register signal.

Another exemplary embodiment of the present invention is another smart battery pack including at least one battery cell adapted to be coupled to an external set via a positive electrode terminal and a negative electrode terminal. A timer circuit is adapted to be coupled to the external set via a data terminal and adapted to apply a predetermined timer circuit signal for a period of time when a predetermined signal is applied from the external set. A first switch is adapted to be controlled by the timer circuit and adapted to apply electric power from the at least one battery cell. A register is adapted to output a predetermined register signal in response to receiving electric power from the at least one battery cell. A smart battery controller is adapted to output information upon receiving the predetermined register signal. The information output may include, but is not limited to, the battery type, the identity of the manufacturer, the manufacturing date, the total battery capacity, or the remaining battery capacity.

According to the smart battery pack and the method for recognizing the battery type using the same, each of the external set and the smart battery pack has only one data terminal for simplified connection structure between them and reduced manufacturing cost.

In addition, the smart battery pack correctly informs the external set of its type, although only one data terminal is used, and electric power is not applied to the external set from the battery cell if the smart battery pack is not suitable for the external set. As such, the external set is protected more reliably.

DETAILED DESCRIPTION

Figure 1:
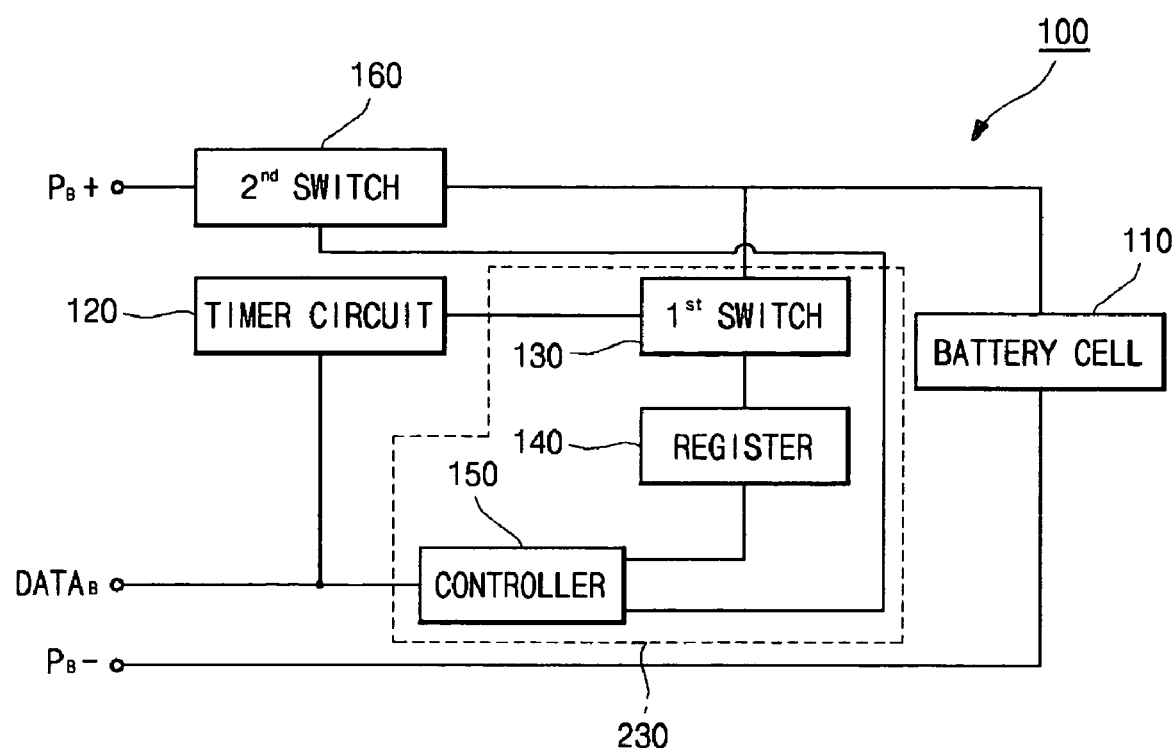
FIG. 1 is a block diagram showing a smart battery pack according to an embodiment of the present invention.

Referring to FIG. 1, an exemplary embodiment of a smart battery pack 100 according to the present invention includes at least one battery cell 110; a timer circuit 120 adapted to output a predetermined timer circuit signal for a period of time; a first switch 130 operated by the timer circuit 120; a register 140 adapted to output a predetermined register signal as dictated by the operation of the first switch 130; a smart battery controller 150 adapted to output predetermined battery type information to an external set 200 as dictated by register 140; and a second switch 160 adapted to be operated in the case of a suitable and supply electric power from the battery cell 110 to the external set 200.

Figure 3:
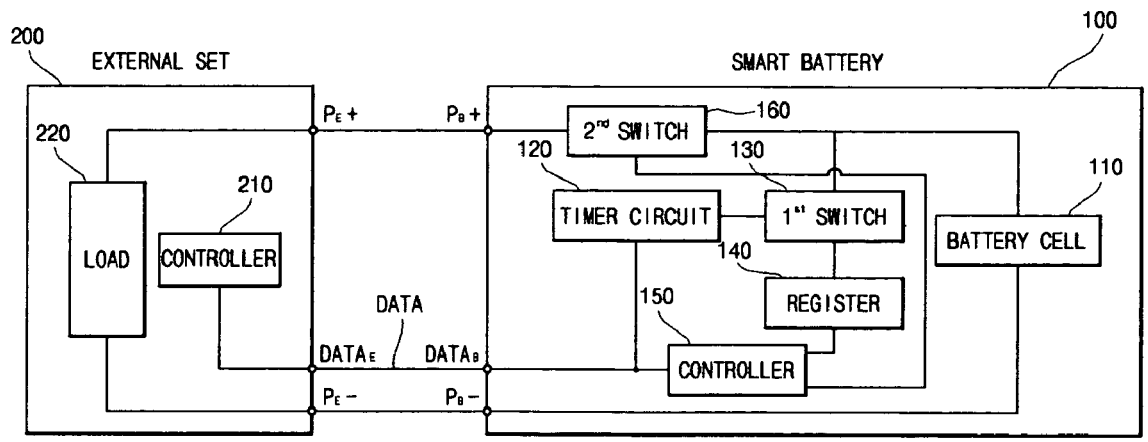
FIG. 3 is a block diagram showing the interconnection between a smart battery pack and an external set according to an embodiment of the present invention.

Referring to FIG. 1 and FIG. 3 briefly, smart battery pack 100 may have a positive electrode terminal $P_B+$ and a negative electrode terminal $P_B-$, which are connected to the positive electrode terminal $P_E+$ and the negative electrode terminal $P_E-$ of external set 200 and form positive and negative electrode lines, respectively.

The timer circuit 120 has a data terminal $DATA_B$ connected thereto which, in turn, is connected to the data terminal $DATA_E$ of the external set 200 and forms a data line DATA. The timer circuit 120 is adapted to output a predetermined timer circuit signal for a period of time when receiving a predetermined signal from the external set 200.

Figure 2:
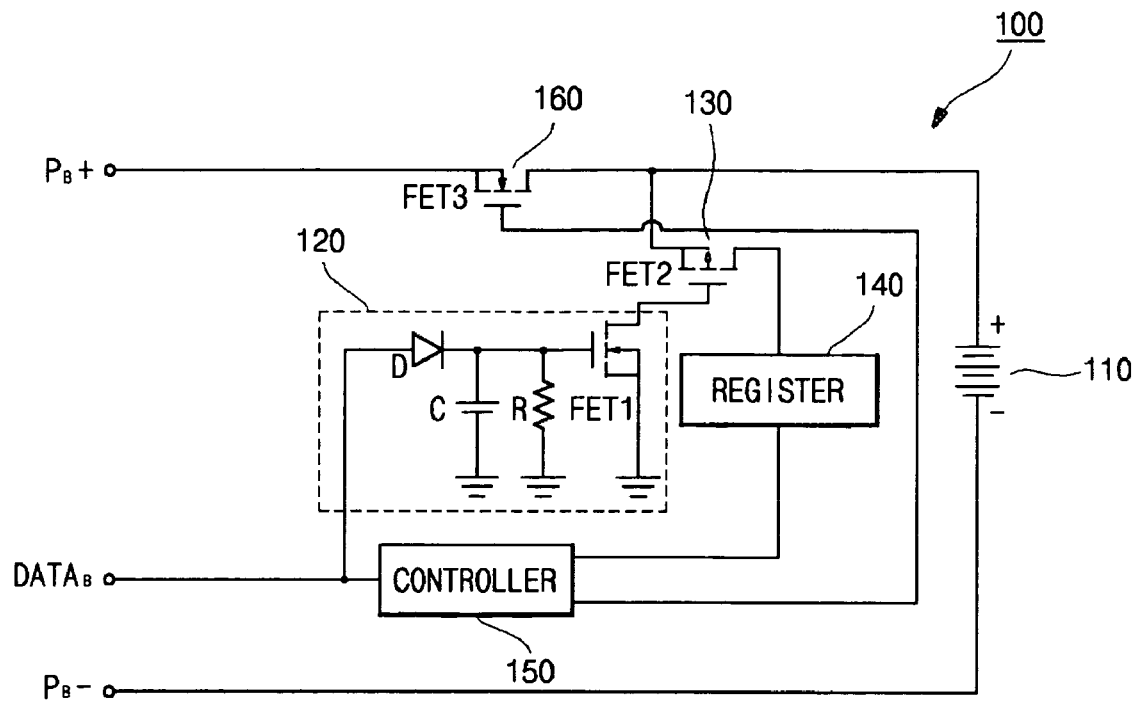
FIG. 2 is a circuit diagram of a smart battery pack according to an embodiment of the present invention.

Referring now to FIG. 2, the timer circuit 120 may include a diode D having its anode end connected to the data terminal $DATA_B$, a time delay capacitor C connected in parallel to the cathode of the diode D, a resistor R, and a field effect transistor FET1 having its gate connected in parallel to the resistor R. The field effect transistor FET1 may be an N-channel type. It will be apparent to those skilled in the art that various types of equivalent circuits may exist in addition to the above timer circuit 120 and the specific construction thereof is not limited herein.

The first switch 130 may be another field effect transistor FET2 having its gate connected to the drain of the field effect transistor FET1 of the timer circuit 120. The field effect transistor FET2 may be a P-channel type. The source and drain of the field effect transistor FET2 constituting the first switch 130 may be connected to the positive electrode of the battery cell 110 and to the register 140, respectively, or vice versa. The first switch 130 may be toggled on when the timer circuit 120 is operated, particularly when the field effect transistor FET1 of the timer circuit 120 is turned on, and applies electric power from the battery cell 110 to the register 140.

The register 140 may output a predetermined register signal to the smart battery controller 150 when electric power is applied from the battery cell 110. The register 140 may be any suitable type of register, including, but not limited to, a sequence control register containing commands to be processed by the smart battery controller 150, a designation register previously having stored battery type information, a control register having a predetermined command word address of the smart battery controller 150, or an equivalent thereof, but the kind is not limited herein.

The smart battery controller 150 may have one side connected to the smart battery pack data terminal $DATA_B$ and another side connected to the register 140. As shown in FIG. 3, a data line DATA may connect $DATA_B$ to $DATA_E$. As such, the smart battery controller 150 may be connected to the external set 200 by only one data line DATA. When the register 140 outputs a predetermined register signal, the smart battery controller 150 may transmit battery type information via the data terminal $DATA_B$ over the single data line DATA to the external set 200. Besides information on battery type, the smart battery controller 150 may also transmit information including, but not limited to, the identity of the manufacturer, the manufacturing date, the total battery capacity, and the remaining battery capacity. The smart battery controller 150 may be realized in any number of implementations including, but not limited to, a micro processor, a digital logic circuit, or an equivalent thereof. By way of example but not limitation, the smart battery controller 150 may use the RS232 communication protocol at 100 Kilobytes per second (K/sec) to transmit data to the external set 200. The data transmission speed, format, and communication protocol employed to transmit data from the smart battery to the external set may be any found to be suitable and are not limited to the RS232 example or its equivalents.

One exemplary embodiment of an external set 200 having terminals $P_E+$, $P_E-$ and $DATA_E$, to which the smart battery pack 100 may be connected, may have a load 220 adapted to consume the electric power of the smart battery pack 100. The load 220 may be connected to the battery cell 110 of the smart battery pack 100 via the positive and negative electrode terminals $P_B+$, $P_B-$. The external set 200 may have an external set controller 210 adapted to read and authenticate the information transmitted from the smart battery pack 100. The external set controller 210 may be connected to the smart battery controller 150 of the smart battery pack 100 via the data terminal $DATA_E$ on the external set 200. When receiving battery type information suitable for the external set 200 from the smart battery controller 150, the external set controller 210 transmits a corresponding authentication signal back to the smart battery controller 150. When deciding that the battery type information is not suitable for the external set 200, the external set controller 210 transmits a notification of this decision to the smart battery controller 150.

Referring to FIG. 3, the second switch 160 may be toggled on when authentication information confirming that the smart battery pack is of a suitable battery type is transmitted from the external set controller 210 of the external set 200 to the smart battery pack controller 150 of the smart battery pack 100. Particularly, the second switch 160 may be toggled on by the controller 150. As the second switch 160 is toggled on in this manner, electric power may be directly supplied from the battery cell 110 to the load 220 of the external set 200 via the smart battery pack positive and negative electrode terminals $P_B+$ and $P_B-$. The second switch 160 may remain toggled off by the controller 150 as long as the external set 200 transmits information indicating that the battery type is not suitable.

Referring back to FIG. 2, the second switch 160 may be a field effect transistor FET3 that may have its gate connected to the smart battery controller 150, its drain connected to the positive electrode of the battery cell 110 (or to the positive electrode terminal $P_B+$) and its source connected to the positive electrode terminal $P_B+$ (or to the positive electrode of the battery cell 110). More particularly, the field effect transistor FET3 may be an N-channel type. The field effect transistor FET3 used as the second switch 160 may be turned on, when the smart battery controller 150 applies a predetermined voltage to the gate, and correspondingly, electric power is transmitted to the load 220 of the external set 200 from the battery cell 110.

Referring to FIGS. 1 and 3, another exemplary embodiment of a smart battery pack 100 according to the present invention includes at least one battery cell 110 coupleable to an external set 200. A timer circuit 120 is coupleable to the external set 200 via a data terminal $DATA_B$ and adapted to control application of electric power from the at least one battery cell 110. A controlling means 230 is coupled to the at least one battery cell. The controlling means 230 provides battery type information to the external set 200 in response to electric power from the at least one battery cell 110. In an exemplary embodiment, the controlling means 230 may include a first switch 130 adapted to apply electric power from the at least one battery cell 110, a register 140 adapted to output a predetermined register signal in response to electric power from the at least one battery cell 110 and a smart battery controller 150 adapted to output battery type information to the external set 200 in response to electric power from the at least one battery cell 200. The controlling means 230 may alternately include any other structures or combinations thereof (whether implemented in hardware, software, a combination of both or otherwise) adapted to provide battery type information to the external set 200 in response to electric power from the at least one battery cell 110.

Figure 4:
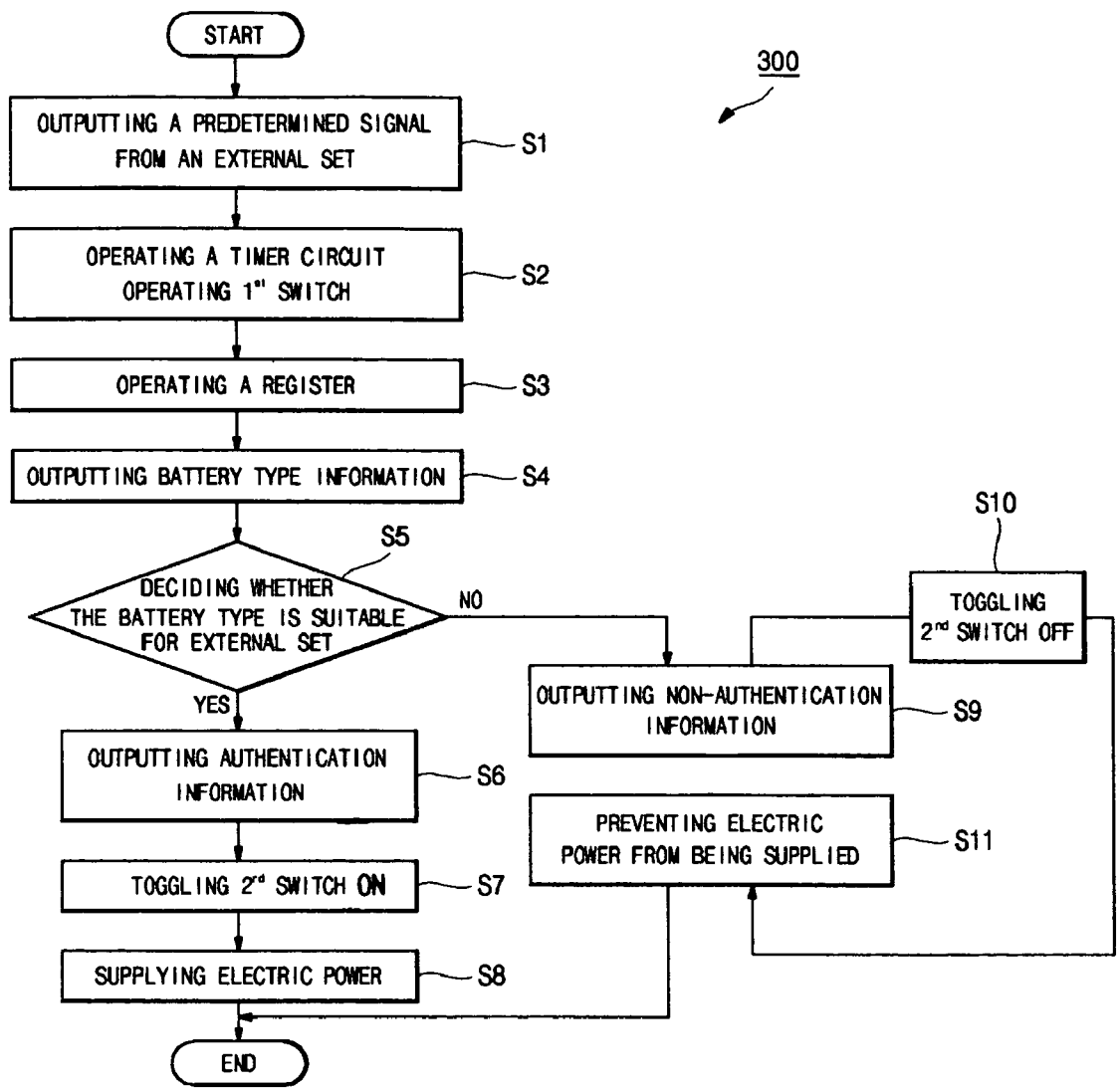
FIG. 4 is a flowchart showing a method for recognizing the battery type according to an embodiment of the present invention.

Referring to FIG. 4, a flowchart showing an exemplary embodiment of a method 300 for recognizing the battery type according to the present invention is illustrated. The steps are presented with accompanying step numbers but the steps can be performed in any suitable order and some steps may be performed simultaneously as would be appreciated by those of ordinary skill in the art.

As shown, the process 300 includes outputting (S1) a predetermined signal from the external set 200 to the smart battery pack 100. In response to receiving the predetermined signal from the external set 200 to the smart battery pack 100, the timer circuit 120 and the first switch 130 are operated (S2). In response to operating the first switch 130, the register 140 is operated (S3). In response to operating the register, battery type information is output (S4) from the smart battery controller 150 to the external set controller 210. In response to receiving output battery type information, a determination is made (S5) as to whether the battery type is suitable for the external set 200. In response to determining that the battery type is suitable for the external set 200, authentication information is output (S6) from the external set controller 210 to the smart battery pack 100. In response to receiving information that the battery type is suitable for the external set 200, the second switch 160 is toggled on (S7). In response to toggling the second switch 160 on, electric power is supplied (S8) from the smart battery pack 100 to the external set 200. In response to determining that the battery type is not suitable for the external set 200, non-authentication information is supplied (S9) from the external set 200 to the smart battery pack 100. In response to receiving non-authentication information from the external set 200, the second switch 160 is toggled off (S10). In response to toggling the second switch off, electric power is prevented from being supplied (S11) from the smart battery pack 100 to the load 220 of the external set 200.

The operation of the smart battery pack 100 constructed as above and the method for recognizing the battery type using the same according to the present invention will now be described.

When the smart battery pack 100 is mounted on the external set 200, the positive electrode terminals $P_B+$, $P_E+$, the negative electrode terminals $P_B-$, $P_E-$ and the data terminals $DATA_B$, $DATA_E$ establish a positive electrode line, a negative electrode line, and a data line DATA, respectively. In this configuration, the external set controller 210 outputs (S1) an electrical signal to the timer circuit 120 of the smart battery pack 100.

After passing through the diode D of the timer circuit 120, the electric signal is delayed for a period of time by the capacitor C and the resistor R and operates the field effect transistor FET1. The first switch 130 is toggled on by the operation of the timer circuit 120. As the gate of the field effect transistor FET1 constituting the first switch 130 enters into low state, electric power is applied (S2) to the drain via the source from the battery cell 110.

As the first switch 130 is operated, electric power is applied to the register 140 from the battery cell 110 and operates (S3) the register 140.

When the register 140 is operated, the smart battery controller 150 outputs (S4) its battery type information to the external set controller 210 of the external set 200 via the smart battery pack data terminal $DATA_B$ over the data line DATA Then, the external set controller 210 of the external set 200 decides (S5) whether the battery type according to the transmitted information is suitable for itself or not. Particularly, the external set controller 210 may compare its previously stored information with the information transmitted from the smart battery pack 100 and determine whether they are equal or not.

If it is decided that the battery type is suitable for itself, the external set controller 210 outputs (S6) predetermined authentication information back to the smart battery controller 150 of the smart battery pack 100.

As authentication information is input to the smart battery controller 150 of the smart battery pack 100, the smart battery controller 150 operates (S7) the second switch 160. Particularly, the smart battery controller 150 applies a predetermined voltage to the gate of the field effect transistor FET3, which constitutes the second switch 160, and toggles it on.

Consequently, the battery cell 110 of the smart battery pack 100 can directly supply electric power to the load 220 of the external set 200 via the positive and negative electrode terminals $P_B+$, $P_B-$ respectively.

If it is decided (S5) that the battery type is not suitable for the external set 200, the external set controller 210 of the external set 200 outputs (S9) non-authentication information to the smart battery controller 150 of the smart battery pack 100.

The smart battery controller 150 of the smart battery pack 100 then maintains the second switch 160 toggled off so that the battery cell 100 is not electrically connected to the load 220 of the external set 200. As a result, the external set 200 is safely protected from electric shock and the like.

Referring to FIGS. 1 and 3, another exemplary embodiment of the present invention is a smart battery pack 100 having at least one battery cell 110 coupleable to an external set 200 via a positive electrode terminal $P_B+$ and a negative electrode terminal, $P_B-$. A timer circuit 120 may be coupleable to the external set 200 via a data terminal $DATA_B$ and adapted to apply a predetermined timer circuit signal for a period of time when a predetermined signal is applied from the external set 200. A first switch 130 may be adapted to be controlled by the timer circuit 120 and adapted to apply electric power from the at least one battery cell 110. A register 140 may be adapted to output a predetermined register signal in response to receiving electric power from the at least one battery cell 110. A smart battery controller 150 may be adapted to output information upon the predetermined register signal being output from the register 140. The information output may be one or more of battery type information, an identity of the manufacturer, a manufacturing date, a total battery capacity, and remaining battery capacity.

Figure 5:
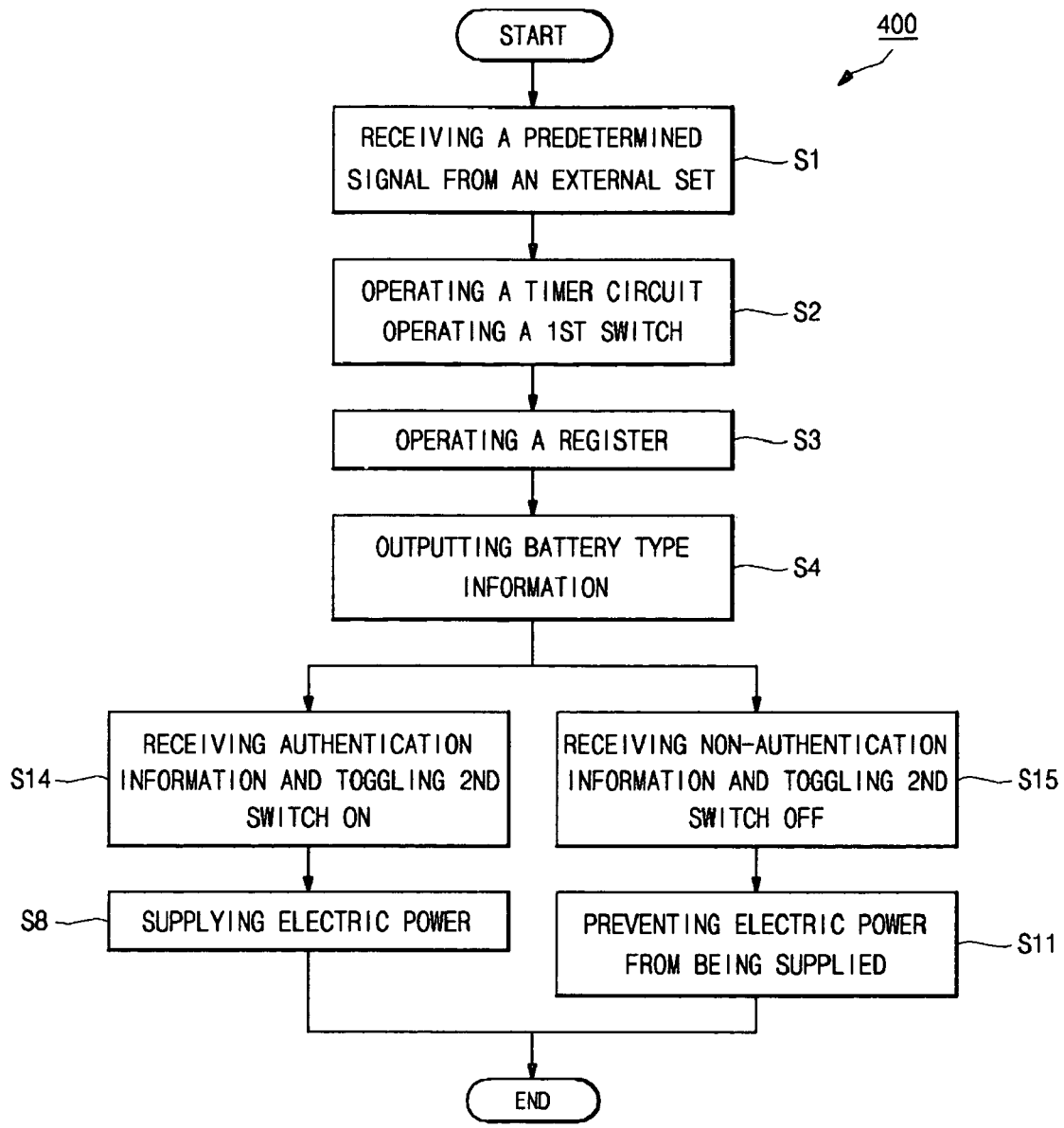
FIG. 5 is a flowchart showing a method for supplying electric power from a smart battery pack if the battery type is suitable according to an embodiment of the present invention.

Referring to FIG. 5, an exemplary embodiment of a method 400 for supplying electric power from a smart battery pack if the battery type is suitable is shown. The method 400 may include receiving (S1) a predetermined signal from an external set 200 via a data terminal $DATA_E$ when a positive electrode terminal $P_B+$, a negative electrode terminal $P_B-$ and a data terminal $DATA_B$ of a smart battery pack are connected to the external set. In response to receiving the predetermined signal from the external set, a timer circuit 120 is operated (S2) and a first switch 130 is operated and correspondingly toggled on. In response to a signal indicating that the first switch 130 has been toggled on, electric power may be applied from a battery cell 110 to operate (S3) a register 140 causing a predetermined register signal to be output from the register 140. In response to outputting the predetermined register signal 140, information on the type of smart battery pack 100 may be output (S4) via the data terminal $DATA_B$. In response to the type of the smart battery pack 100 being suitable, authentication information may be received (S14) and a second switch 160 may be toggled on. In response to the second switch 160 being toggled on, electric power may be supplied (S8) from the smart battery pack 100. Alternately, in response to the type of the smart battery pack 100 not being suitable, non-authentication information may be received (S15) and a second switch 160 may be toggled off. In response to the second switch 160 being toggled off, electric power may be prevented from being supplied (S11) from the smart battery pack 100.

Figure 6:
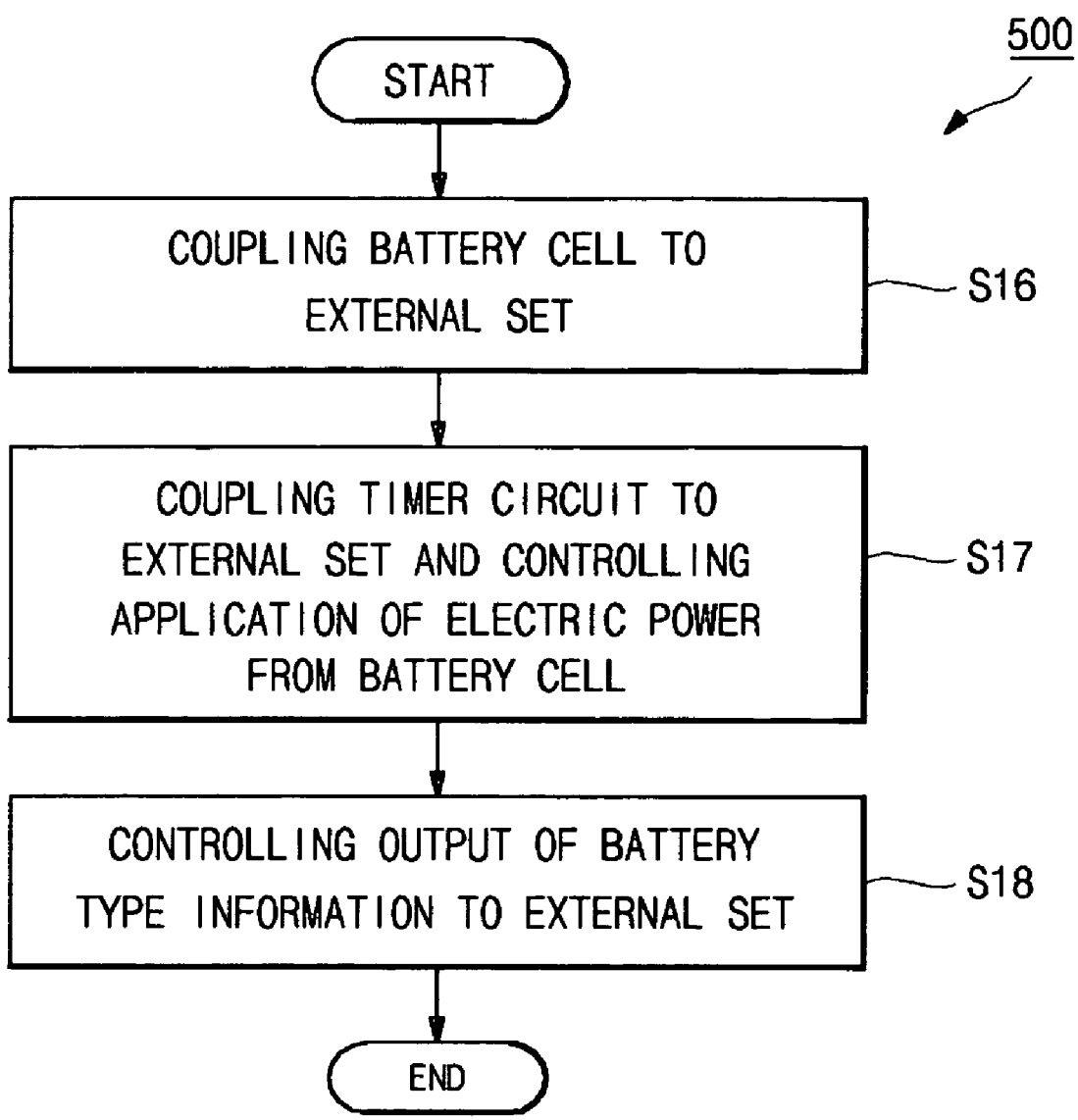
FIG. 6 is a flowchart showing a method for recognizing battery type of a smart battery pack according to an embodiment of the present invention.

Referring to FIG. 6, another method 500 for recognizing battery type of a smart battery pack according to an exemplary embodiment of the present invention is provided. At least one battery cell 110 is coupled (S16) to an external set 200. A timer circuit 120 coupled to the external set 200 via a data terminal $DATA_B$ of a smart battery pack controls (S17) application of electric power from the at least one battery cell 110. In response to the application of electric power, battery type information is output (S18) to the external set 200.

As mentioned above, according to the inventive smart battery pack and the method for recognizing the battery type using the same, each of the external set and the smart battery pack has a data terminal for simplified connection structure between them and reduced manufacturing cost.

In addition, the smart battery pack correctly informs the external set of its type, although one data terminal is used, and electric power is not applied to the external set from the battery cell if the smart battery pack is not suitable for the external set. As such, the external set is protected more stably.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A smart battery pack comprising:
    at least one battery cell coupled to an external electronic device via a positive electrode terminal and a negative electrode terminal;
    a timer circuit coupled to the external electronic device via a data terminal and adapted to apply a predetermined timer circuit signal for a period of time when a signal from the external electronic devices is applied to the timer circuit;
    a register adapted to output a register signal upon receiving electric power from the at least one battery cell;
    a first switch controlled by the timer circuit and adapted to apply electric power from the at least one battery cell to the register for powering the register; and
    a battery controller coupled to the data terminal and adapted to output battery type information in response to the register signal to the data terminal.

2. The smart battery pack as claimed in claim 1, wherein all data between the smart battery pack and the external electronic device is transmitted over the data terminal consisting of a single line terminal.

3. The smart battery pack as claimed in claim 1, wherein the smart battery controller is adapted to transmit the battery type information to the external electronic device via the data terminal in response to the register signal.

4. The smart battery pack as claimed in claim 1, wherein the timer circuit comprises: between the data terminal and the first switch,
    a diode coupled in the forward direction;
    a capacitor coupled to a cathode end of the diode;
    a resistor coupled in parallel to the capacitor; and a field effect transistor having a gate coupled in parallel to the resistor.

5. The smart battery pack as claimed in claim 4, wherein the first switch is a field effect transistor adapted to be turned on when the field effect transistor of the timer circuit is turned on.

6. The smart battery pack as claimed in claim 1, further comprising a second switch connected between the positive electrode terminal and the at least one battery cell and controlled by the smart battery controller.

7. The smart battery pack as claimed in claim 1, wherein the smart battery controller is adapted to toggle the second switch on when an authentication signal confirming that the battery type information is suitable is transmitted from the external electronic device to the smart battery controller so that electric power is applied from the at least one battery cell to the external electronic device.

8. The smart battery pack as claimed in claim 6, wherein the second switch is a field effect transistor having a gate voltage controlled by the smart battery controller.

9. The smart battery pack as claimed in claim 6, wherein the second switch is a field effect transistor and a discharging state of the at least one battery cell is controlled by the smart battery controller.

10. A method for recognizing the battery type comprising:
outputting a predetermined signal from an external electronic device to a smart battery pack via a data terminal;
in response to receiving the predetermined signal from the external electronic device, operating a timer circuit and toggling a first switch on;
applying electronic power from a battery cell through the first switch to a register for powering the register;
outputting a register signal from the register;
in response to the register signal, outputting battery type information from the smart battery pack to the external electronic device via the data terminal; and
in response to outputting battery type information, reading the battery type information and deciding whether the type of the smart battery pack is suitable for itself or not.

11. The method for recognizing the battery type as claimed in claim 10, further comprising outputting information corresponding to whether the type of the smart battery pack is suitable for itself or not back to the smart battery pack via the data terminal.

12. The method for recognizing the battery type as claimed in claim 11, further comprising in response to deciding that the type of the smart battery pack is suitable for the external electronic device, outputting authentication information causing the smart battery pack to toggle on a second switch coupled between the external electronic device and the smart battery pack so that electric power is supplied from the smart battery pack to the external electronic device.

13. The method for recognizing the battery type as claimed in claim 11, further comprising, in response to deciding that the type of the smart battery pack is not suitable for the external eletronic device, outputting non-authentication information causing the smart battery pack to toggle off the second switch coupled between the external electronic device and the smart battery pack so that electric power is prevented from being supplied from the smart battery pack to the external electronic device.

14. A smart battery pack comprising:
at least one battery cell coupleable to an external electronic device via a positive electrode terminal and a negative electrode terminal;
a timer circuit coupleable to the external electronic device via a data terminal and adapted to apply a timer circuit signal for a period of time when a signal from the external electronic device;
a register adapted to output a register signal upon receiving electric power from the at least one battery cell;
a second transistor controlled by the timer circuit and adapted to apply the electric power from the at least one battery cell to the register for powering the register; and
a battery controller coupled to the data terminal and adapted to output information in response to the register signal to the data terminal,
wherein the timer circuit is coupled between the data terminal and a gate of the second transistor and comprises a diode coupled in the forward direction with the data terminal, a capacitor coupled to a cathode end of the diode, a resistor coupled in parellel with the capacitor, and a first transistor having a gate directly connected in parellel with the resistor.

15. The smart battery pack as claimed in claim 14, wherein all data between the smart battery pack and the external electronic device is transmitted over the data terminal consisting of a single line terminal.

16. The smart battery pack as claimed in claim 14, wherein the smart battery controller is adapted to transmit one or more of battery type information, an identity of the manufacturer, a manufacturing date, a total battery capacity, and remaining battery capacity to the external electronic device via the data terminal in response to the register signal.

17. A method for recognizing battery type of a smart battery pack comprising:
coupling at least one battery cell to an external electronic device;
coupling a timer circuit to the external electronic device via a data terminal, the timer circuit being adapted to control a first switch and application of electric power from the at least one battery cell through the first switch to a register for powering the register; and
in response to the application of electric power, outputting battery type information to the external electronic device.

18. A method for supplying electric power from a smart battery pack to an external electronic device if the battery type is suitable comprising:
receiving a signal from an external electronic device via a data terminal;
in response to receiving the signal from the external electronic device, operating a timer circuit and toggling a first switch on;
applying electronic power from a battery cell through the first switch to a register for powering the register;
outputting a register signal from the register;
in response to the register signal, outputting battery type information via the data terminal;
in response to an external electronic device deciding that type of the smart battery pack is suitable, receiving authentication information from an external electronic device;
in response to receiving authentication information from the external electronic device, supplying electric power from the smart battery pack to the external electronic device;
in response to the external electronic device deciding that type of the smart battery pack is not suitable, receiving non-authentication information from the external electronic device; and in response to receiving non-authentication information from the external electronic device, preventing electric power from being supplied from the smart battery pack to the external electronic device.

19. A smart battery pack comprising:
   at least one battery cell coupleable to an external electronic device;
   a timer circuit coupleable to the external electronic device via a data terminal and adapted to control a first switch and application of electric power from the at least one battery cell through the first switch to a register for powering the register; and
   a controlling means coupled to the at least one battery cell, the controlling means providing battery type information to the external electronic device in response to electric power from the at least one battery cell.

20. The smart battery pack as claimed in claim 19, wherein the controlling means comprises:
   a first switch adapted to apply electric power from the at least one battery cell;
   a register adapted to output a predetermined register signal in response to electric power from the at least one battery cell; and
   a smart battery controller adapted to output battery type information to the external electronic device in response to electric power from the at least one battery cell.

* * * * *

UNITED STATES PATENT AND TRADEMARK OFFICE
CERTIFICATE OF CORRECTION

| | |
|---|---|
| PATENT NO. | : 7,492,121 B2 |
| APPLICATION NO. | : 11/216458 |
| DATED | : February 17, 2009 |
| INVENTOR(S) | : Jong Sam Kim et al. |

It is certified that error appears in the above-identified patent and that said Letters Patent is hereby corrected as shown below:

| | |
|---|---|
| Column 8, Claim 3, line 59 | Delete "smart" |
| Column 9, Claim 6, line 10 | Delete "smart" |
| Column 9, Claim 7, line 11 | Delete "claim 1" <br> Insert -- claim 6 -- |
| Column 9, Claim 7, line 12 | Before "battery" <br> Delete "smart" |
| Column 9, Claim 7, line 15 | After "the" <br> Delete "smart" |
| Column 9, Claim 7, line 16 | After "that" <br> Insert -- the -- |
| Column 9, Claim 8, line 20 | After "the" <br> Delete "smart" |
| Column 9, Claim 9, line 23 | After "the" <br> Delete "smart" |
| Column 9, Claim 10, line 25 | Delete "the" <br> Insert -- a -- |
| Column 9, Claim 10, line 37 | After "outputting" <br> Insert -- the -- |

Signed and Sealed this
Twenty-ninth Day of March, 2011

David J. Kappos
*Director of the United States Patent and Trademark Office*

CERTIFICATE OF CORRECTION (continued)
U.S. Pat. No. 7,492,121 B2

| | |
|---|---|
| Column 9, Claim 12, line 51 | After "that" Insert -- the -- |
| Column 9, Claim 13, line 56 | Delete "electric" Insert "electronic" |
| Column 9, Claim 13, line 57 | After "off" delete "the" and Insert -- a -- |
| Column 9, Claim 13, line 59 | Delete "smart battery pack" Insert -- battery cell -- |
| Column 9, Claim 13, line 59 | After "that" Insert -- the -- |
| Column 10, Claim 14, line 3 | Before "from" Insert -- is applied -- |
| Column 10, Claim 16, line 25 | After "the" Delete "smart" |
| Column 10, Claim 17, line 30 | After "recognizing" Insert -- a -- |
| Column 10, Claim 17, line 39 | Before "electric" Insert -- the -- |
| Column 10, Claim 18, line 43 | Delete "the" Insert -- a -- |
| Column 10, claim 18, line 45 | Delete "an" Insert -- the -- |
| Column 10, Claim 18, line 55 | Delete "an" Insert -- the -- |
| Column 10, Claim 18, line 57 | Delete "an" Insert -- the -- |
| Column 10, Claim 18, line 59 | Before "authentication" Insert -- the -- |
| Column 10, Claim 18, line 64 | Insert -- the -- Before "type" |

CERTIFICATE OF CORRECTION (continued)
U.S. Pat. No. 7,492,121 B2

| | |
|---|---|
| Column 11, Claim 18, line 1 | Insert -- the -- After "receiving" |
| Column 11, Claim 18, line 2 | After "preventing" Insert -- the -- |
| Column 12, Claim 20, line 5 | Delete "a" Insert -- the -- |
| Column 12, Claim 20, line 5 | Insert -- the -- Before "electric" |
| Column 12, Claim 20, line 8 | Before "electric" Insert -- the -- |
| Column 12, Claim 20, line 10 | After output Insert -- the -- |
| Column 12, Claim 20, line 12 | Before "electric" Insert -- the -- |